(12) United States Patent
Atkinson (10) Patent No.: US 9,686,008 B2
(45) Date of Patent: Jun. 20, 2017

(54) PROTECTION OF COMMERCIAL COMMUNICATIONS

(71) Applicant: Orbital Sciences Corporation, Dulles, VA (US)

(72) Inventor: Leonard Atkinson, Oak Hill, VA (US)

(73) Assignee: Orbital Sciences Corporation, Dulles, VA (US)

( * ) Notice: Subject to any disclaimer, the term of this patent is extended or adjusted under 35 U.S.C. 154(b) by 505 days.

(21) Appl. No.: 14/211,271

(22) Filed: Mar. 14, 2014

(65) Prior Publication Data

US 2016/0254853 A1 Sep. 1, 2016

Related U.S. Application Data (60) Provisional application No. 61/791,057, filed on Mar. 15, 2013.

(51) Int. Cl.
*H04B 7/185* (2006.01)
*H04W 84/06* (2009.01)
(Continued)

(52) U.S. Cl.
CPC ....... *H04B 7/18513* (2013.01); *H04L 1/0041* (2013.01); *H04W 84/06* (2013.01); *H04L 25/14* (2013.01)

(58) Field of Classification Search
None
See application file for complete search history.

(56) References Cited

U.S. PATENT DOCUMENTS 5,574,969 A * 11/1996 Olds .................. H04B 7/18539
455/429
6,738,363 B1 * 5/2004 Best ...................... H04W 72/10
370/322

(Continued)

FOREIGN PATENT DOCUMENTS

GB   WO 03096575 A1 * 11/2003 ......... H04B 7/18584
WO   WO-03/096575 A1    11/2003

OTHER PUBLICATIONS

Khan et al., "Multi Radio Diversity for Satellite-Terrestrial Mobile Comunications," Circuits and Systems for Communications, 2008. ICCSC 2008. 4th IEEE Intnl. Conf. On, IEEE, Piscataway, NJ, pp. 673-677, XP031268782 (May 26, 2008).

(Continued)

*Primary Examiner* — Chi H Pham
*Assistant Examiner* — Vladislav Agureyev
(74) *Attorney, Agent, or Firm* — Christensen, Fonder, Dardi & Herbert PLLC (57) ABSTRACT

Methods and systems are provided for a protected communications architecture in which a pool of limited availability channels are shared through the transmission of encoded symbols with time-varying path diversity by a pool of users. The communications architecture can be managed by a network controller that stores availability data describing the availability of multiple-access satellite communications channels. The network controller allocates a first user to a first time-varying subset of the plurality of multiple-access satellite or terrestrial communications channels based on the availability data. The network controller updates the availability data based on the allocation of the first user. The network controller allocates a second user to a second time-varying subset of the plurality of multiple-access satellite or terrestrial communications channels based on the updated availability data. This process is repeated until all (Continued)

users are allocated bandwidth based on their priority, demand, and the overall bandwidth available within the pool.

20 Claims, 7 Drawing Sheets

(51) Int. Cl.
  *H04L 1/00* (2006.01)
  *H04L 25/14* (2006.01)

(56) References Cited

U.S. PATENT DOCUMENTS

| | | | | |
|---|---|---|---|---|
| 7,386,001 | B1* | 6/2008 | Kim | H04B 1/707 370/441 |
| 7,590,921 | B1* | 9/2009 | Goodson | H03M 13/373 714/746 |
| 7,746,800 | B2* | 6/2010 | Raghothaman | H04B 7/0417 370/252 |
| 8,238,453 | B1* | 8/2012 | Lou | H04L 1/0002 375/259 |
| 2003/0050008 | A1* | 3/2003 | Patterson | H04B 7/18578 455/12.1 |
| 2006/0135081 | A1* | 6/2006 | Mysore | H04B 7/0845 455/70 |
| 2007/0098007 | A1* | 5/2007 | Prodan | H04L 12/2801 370/443 |
| 2007/0147542 | A1* | 6/2007 | Schmidt | H03M 13/251 375/298 |
| 2007/0183352 | A1* | 8/2007 | Muhammad | H04W 72/1215 370/312 |
| 2007/0293214 | A1* | 12/2007 | Ansari | H04B 7/18513 455/427 |
| 2008/0219251 | A1* | 9/2008 | Xue | H03M 13/29 370/389 |
| 2008/0268838 | A1* | 10/2008 | Zufall | H04B 7/18536 455/430 |
| 2011/0286325 | A1* | 11/2011 | Jalali | H04B 7/18506 370/221 |
| 2014/0362748 | A1* | 12/2014 | Barany | H04L 5/14 370/281 |
| 2015/0382337 | A1* | 12/2015 | Ko | H04B 7/0413 370/335 |
| 2016/0198480 | A1* | 7/2016 | Stanwood | H04L 5/0073 370/329 |

OTHER PUBLICATIONS

Liu, Y. et al., "Study on diversity methods in mobile satellite communication systems," Wireless Communications & Signal Processing, WCSP 2009. Intnl. Cnf. On, IEEE, Piscataway, NJ, pp. 1-4, XP031594772 (Nov. 13, 2009).

* cited by examiner

Figure 1

Prior Art

PROTECTION OF COMMERCIAL COMMUNICATIONS

CROSS REFERENCE TO RELATED APPLICATIONS

This disclosure claims the benefit of U.S. Provisional Application No. 61/791,057, filed Mar. 15, 2013, which is hereby incorporated by reference herein in its entirety.

BACKGROUND

High priority government and commercial (e.g., banking, utility) systems require reliable communications to assure national security. However, true government protected communications systems have limited capacity and are generally reserved for the highest strategic and tactical priorities. As a result of cost and bandwidth constraints, the remainder of essential government communications are forced to utilize commercial communications channels which are subject to outages by equipment reliability, weather, unintentional or intentional interference, jamming, or other denial-of-service attacks. Because these commercial communications channels offer no protection or transmission security, essential government communications are subject to intentional or unintentional outages beyond acceptable levels. However, government funding limitations do not allow for the purchase of additional national protected communications satellites (e.g., MILSTAR, AEHF). As a result, methods of achieving higher availability and data protection through affordable commercial channels are needed.

SUMMARY

The communications system described herein leverages commercial-quality channels to provide robust protected communications having availability comparable or superior to national strategic systems. This is achieved using coordinated path diversity, encryption, forward error correction, and/or adaptive traffic routing and control. In particular, multiple individual commercial-quality channels, each having relatively low availability due to quality of service limitations or to denial of service susceptibilities, are pooled and cooperatively shared between users in order to provide a robust and adaptive protected communications service having extremely high availability. Each of N users notionally shares 1/N of each individual satellite and/or ground channels such that the loss of any but one of the pool of channels will allow traffic for all users to continue, albeit at a reduced data rate. In addition, an adaptive control channel can dynamically adjust coding rates, bandwidth allocations, user priority, and other network parameters to provide optimum traffic flow in view of the availability of the pool channels and their quality of service. In this way, commercial services can be configured to provide overall service and availability commensurate with government protected strategic communications systems, but at a fraction of the cost by utilizing existing on-orbit and deployed commercial systems.

In some embodiments, a communications architecture is provided that consists of a pool of two or more limited availability channels shared by a pool of two or more users, such that each user communicates over multiple channels, and channels can be used by multiple users. The pooled path diversity in this architecture provides data protection, transmission security, and lower probability of intercept. It also pools excess channel capacity so that other users may use bandwidth that was wasted in prior systems having a single channel per user. A centralized channel control function will allocate users to multiple-access channels and optimally control user bandwidth based on need, priority, and active pool bandwidth availability.

Some embodiments include a multi-path communication apparatus for multiplexing data within a plurality of communications channels. The multi-path communication apparatus includes control circuitry and communications circuitry. The control circuitry is configured to generate a plurality of pieces of data based on a message to be transmitted, and assign the plurality of pieces of data to a plurality of communications channels. The communications circuitry transmits a first piece of the plurality of pieces of data through a first channel of the plurality of communications channels, and transmits a second piece of the plurality of pieces of data through a second channel of the plurality of communications channels. These transmissions may occur sequentially or parallel in time.

In some embodiments, the first channel of the plurality of communications channels is a satellite communications channel. In some embodiments, the first channel of the plurality of communications channels a terrestrial communications channel or an airborne relay. In some embodiments, the communications circuitry comprises at least one of a phased array and a multi-feed parabolic antenna.

In some embodiments, the control circuitry is further configured to apply forward error correction to the message. In some embodiments, the multi-path communication apparatus transmits an allocation request to a network controller, and receives channel allocation information, based on the allocation request, from the network controller. The allocation request can include at least one of a priority and a bandwidth.

Some embodiments include a multi-path communication apparatus for receiving a message transmitted over a plurality of communications channels. The multi-path communication apparatus includes control circuitry and communications circuitry. The communications circuitry receives a first piece of a transmitted message from a first channel of a plurality of communications channels assigned to a transmitting apparatus, and receives a second piece of the transmitted message through a second channel of the plurality of communications channels assigned to the transmitting apparatus. These receipts may occur sequentially or parallel in time. The control circuitry combines the first piece and the second piece to recover the transmitted message.

In some embodiments, the multi-path communication apparatus determines a quality of service metric for the first channel, and transmits, using the control circuitry, the quality of service metric to one of the transmitting apparatus and a network controller. In some embodiments, the multi-path communication apparatus determines that it did not successfully receive the first piece of the transmitted message, and requests, using the communications circuitry, that the transmitting apparatus retransmit the first piece of the transmitted message using at least one of a different channel and a different code rate. In some embodiments, the multi-path communication apparatus decodes the received first piece and second piece of the transmitted message.

Some embodiments include a network controller for enabling multiplexed data within a plurality of communications channels. The network controller is configured to store availability data describing availability of a plurality of communications channels. The network controller allocates a first user to a first subset of the plurality of communications channels based on the availability data, and updates the availability data based on the allocation of the first user. The network controller also allocates a second user to a second subset of the plurality of communications channels based on the updated availability data.

In some embodiments, the updating of the availability data is further based on data describing a channel quality. In some embodiments, the network controller assigns a forward error correction rate to the first user.

In some embodiments, a first channel is included in both the first subset and the second subset, and the first user and the second user share the first channel using a multiple channel-access scheme. The network controller can allocate the first user and the second user to the first subset and the second subset based on a priority of the first user and a priority of the second user. If the network controller assigns a bandwidth to each of the first user and the second user, the network controller can allocate the first user and the second user to the first subset and the second subset based on the bandwidths of the first user and the second user.

In some embodiments, the plurality of communications channels comprise at least one of a commercial satellite communication channel and a government satellite communications channel.

Another aspect includes a method for allocating users to a plurality of communications channels. The method involves storing availability data describing the availability of the plurality of communications channels, allocating a first user to a first subset of the plurality of communications channels based on the availability data, updating the availability data based on the allocation of the first user, and allocating a second user to a second subset of the plurality of communications channels based on the updated availability data.

In some embodiments, the updating of the availability data is further based on data describing a channel quality.

DETAILED DESCRIPTION

To provide an overall understanding of the invention, certain illustrative embodiments will now be described, including systems and methods for protected commercial communications. However, it will be understood by one of ordinary skill in the art that the systems and methods described herein may be adapted and modified as is appropriate for the application being addressed and that the systems and methods described herein may be employed in other suitable applications, and that such other additions and modifications will not depart from the scope thereof.

In order to assure communications through inherently limited availability, unprotected commercial channels, all of the individual participating government user channels can be combined into a large pool of channels, and all of the individual participating users can be combined into a pool of users. For example, if each user who once used 100% of one limited availability channel now uses 1% of 100 limited availability channels and utilizes data redundancy (e.g., forward error correction), then no data loss results from an outage of one or many individual channels which previously would have taken out one or many individual users. As long as even one of the pool of channels remains active, then subject to adequate forward error correction encoding, all of the users can continue to get data through, although at a reduced information rate. This network design can be used on as little as two channels and two users coordinated by the users on either end of the link, or by hundreds of channels coordinated by a network control node.

By pooling parallel communications paths, network outage probability becomes the product of all the individual parallel channel outage probabilities. For example, by pooling 100 channels each with 1% probability of outage ($10^{-2}$), the probably of total network outage becomes $(10^{-2})^{100}=10^{-200}$, a vanishingly small likelihood even better than existing national protected communications systems. The overall network capacity scales with active network bandwidth which is, in turn, related with a certain probability. For example, with 50 of 100 equal bandwidth channels active, there will be 50% overall channel capacity available but being comprised with 1% outage channels, this will only be exceeded with a probability of $10^{-100}$. Therefore, fractional channel capacity availability also improves as the pool of channels becomes greater.

Some overall channel capacity is lost as a result of pooling resources relative to the prior art of 1 user per channel. There will be small overhead for control channels (where used), guard bands for TDMA, forward error correction code bandwidth increases, and CDMA capacity margins, etc. However, by careful system design these efficiency losses can be limited to only a few percent. In addition, the excess channel capacity of each single user that was wasted in prior single channel per user systems is now made available to other users through the pooled architecture, which should more than make up for the control channel and multiplexing bandwidth loss.

Figure 1:
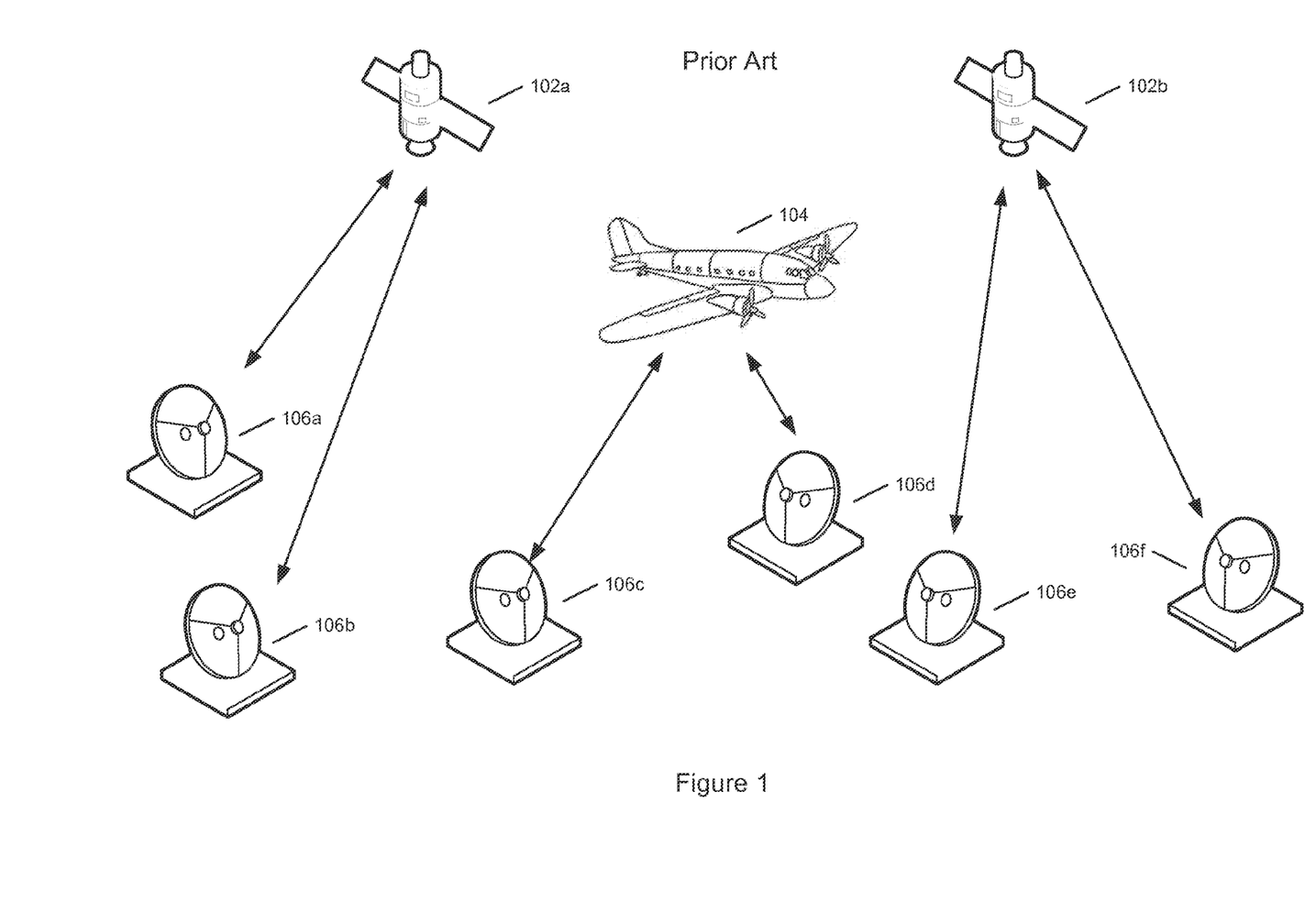
FIG. 1 is a block diagram showing the prior art use of commercial or limited availability communications links.

FIG. 1 is a block diagram showing the prior art use of commercial or limited availability communications links whereby one set of users utilizes a single leased or otherwise provided communications channel subject to significant availability limitations. Each antenna station 106a-f can communicate over only one communication channel, through only one physical path (in this example, through a satellite 102a or 102b, or through an airplane link 104). The path has two links: an uplink to the satellite 102 or airplane 104, and a downlink to a different ground station. In this architecture, if one of the channels between ground stations is compromised (e.g., if the link between leftmost station 106a and satellite 102a is jammed), that ground station will no longer be able to communicate with its intended recipient (in this case, 106b).

Figure 2:
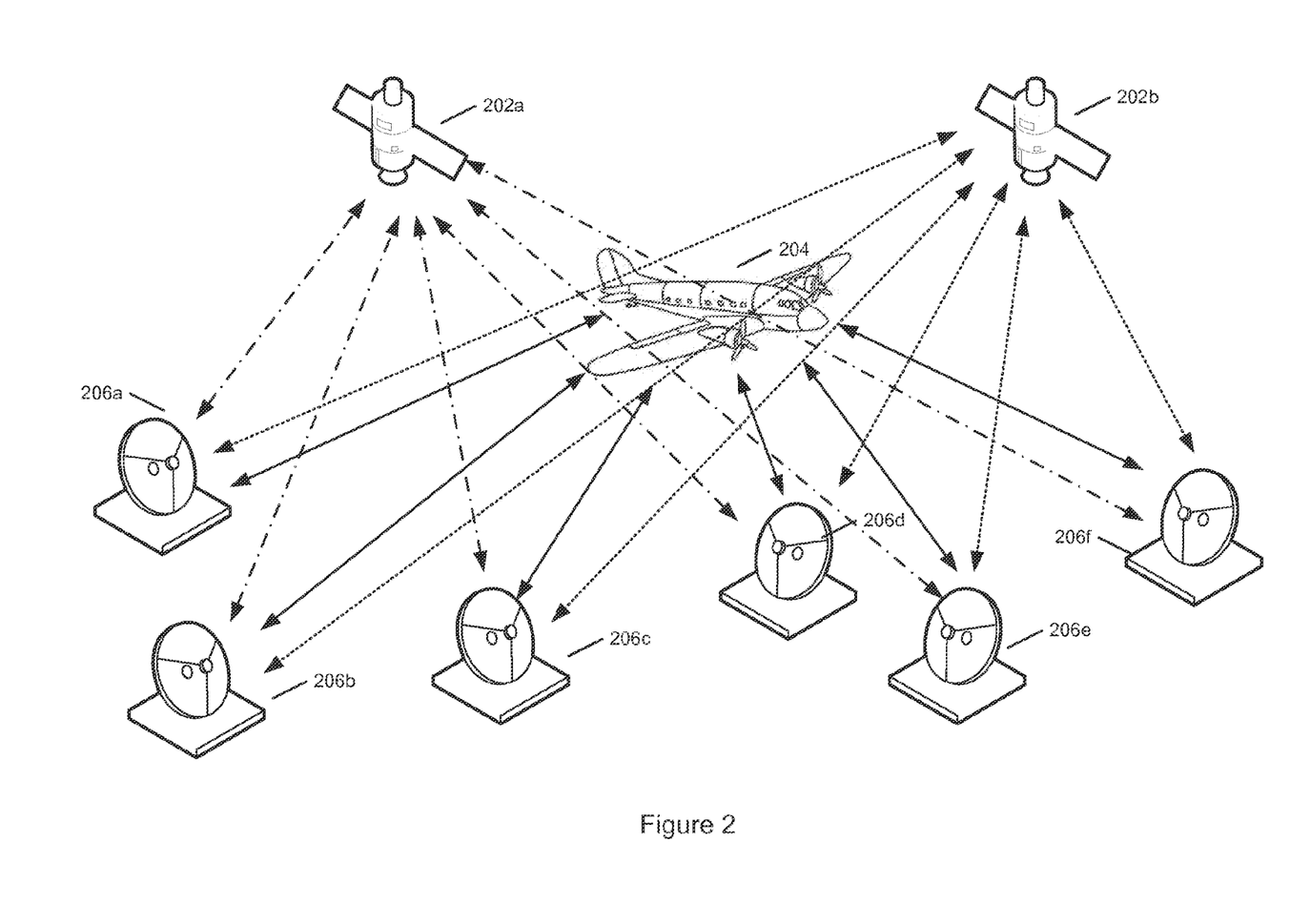
FIG. 2 is a block diagram showing the communications channels available to users when the users are pooled and can multiplex communications through all pooled channel.

FIG. 2 is a block diagram showing a communications architecture in which all pooled users 206a-f can multiplex communications through all of the pooled channels. The pooled channels include channels through satellite pathways (via satellites 202a and 202b) and an airborne relay (via airplane 204). In addition to these pathways, the architecture may include additional satellite pathways; additional airborne relays; terrestrial communications pathways, such as fiber channels, cable channels, terrestrial microwave links, and Internet links; and/or any other type communication path. The pathways available to the pool of users may change dynamically due to relative motion of the users and the transponders.

As shown in FIG. 2, each ground station 206a-f is able to communicate with other ground stations via multiple physical paths and using multiple types of communication links. The ground stations 206a-f may include communications circuitry enabling data transfer via the communication links. For example, the ground stations 206a-f may include a single antenna or an array of antennas, such as a phased array, or a lower cost switched multi-feed parabolic antenna. The ground stations 206a-f may also include different types of antennas or other types of communications circuitry to enable them to communicate using the any of the types of communications paths mentioned above. In the example shown in FIG. 2, if the leftmost ground station 206a is communicating with the other ground station 206b and the link between leftmost ground station 206a and satellite 202a is compromised (e.g., because of interference), the ground station 206a can still communicate via airborne relay 204 or satellite 202b. Or, if one communication channel through satellite 202a is unavailable (e.g., a certain frequency is jammed) but other channels on this satellite are available, the ground station 206a may still be able to communicate via a different channel through the same satellite 202a (e.g., over a different frequency).

In some embodiments, a ground station may communicate through multiple channels simultaneously. In such embodiments, the ground station may have control circuitry, such as a processor, for generating multiple pieces of data from a message to be transmitted. The control circuitry may add correction information or redundancy information to a message so that even if a portion of the encoded message is not communicated properly or received by its recipient, the original message can be recovered by the recipient using error correction decoding, without needing to request retransmission. For example, a transmitting station may use forward error correction (FEC) coding to add redundancy and improve likelihood of data recovery. The transmitting station may use any channel coding algorithm, such as Reed-Solomon coding. Block codes, convolutional codes, low density parity codes, cyclic codes or other forward error correction codes can be used. In some embodiments, control circuitry of the transmitting station may also encrypt the message at one or multiple levels before or after it is coded. Pieces of the encoded message may be sent through different channels and, in some embodiments, through different physical paths. The receiving station may receive some or all of the pieces of the encoded message, and, using control circuitry, recombine the pieces into all or part of the transmitted message, and use a decoding algorithm, such as a Viterbi decoder, to recover the original message from the received data. The above-described steps may be performed in any order. These operations may be performed in the physical layer, data link layer, or transport layer.

Figure 5:
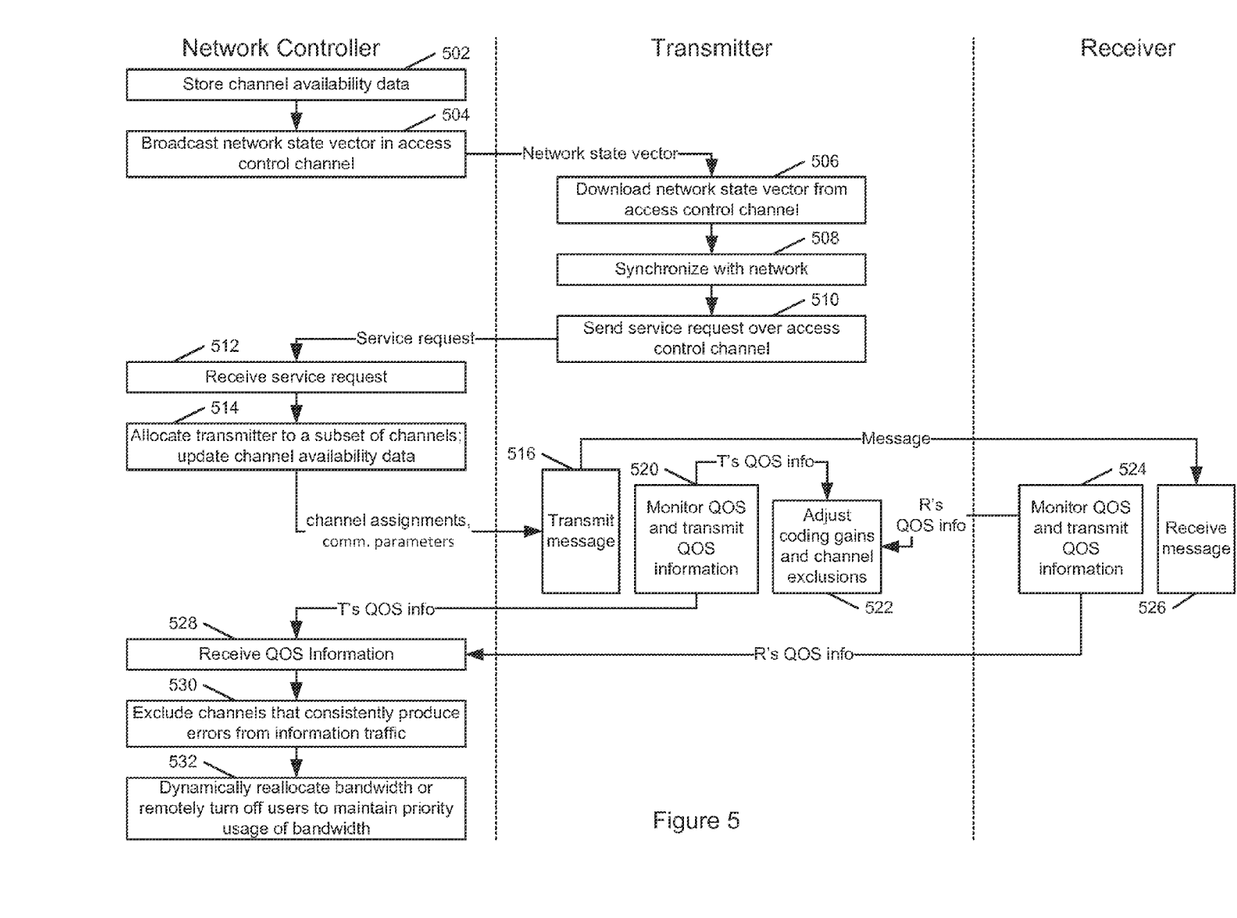
FIG. 5 is a flow diagram showing the operation of and interactions between a network controller, a transmitting station, and a receiving station, resulting in the transmitting station sending a message to the receiving station.

In some embodiments, the FEC code rate and other properties of the message may be dynamically selected based on channel properties or instructions from a network controller. For example, a recipient may determine a bit-error rate or another quality of service (QOS) metric and send this to the transmitting stations as feedback. The QOS information may be encrypted at the same level or type of encryption as the message or at a different level of encryption. Based on the QOS feedback, the transmitting station then may add more redundancy (e.g., using a higher FEC encoding rate in the case of a high bit error rate) or less redundancy (e.g., using a lower FEC encoding rate in the case of a lower bit error rate) in order to use the communication bandwidth most efficiently while still ensuring success of transmission. The recipient may also provide feedback about an error in a channel (e.g., it is not receiving any signal through a particular channel) or about which channels it is receiving from, and based on this information, the transmitting station may redirect communications through one or more available alternative channels or send messages through fewer channel. In some embodiments, bit error rate and channel properties are received by a network controller, which sends commands to transmitters indicating, for example, which pathway(s) to use, which channel(s) to use, what code rate(s) to use, etc. An exemplary transmission process using a network controller is shown in FIG. 5.

Figure 3:
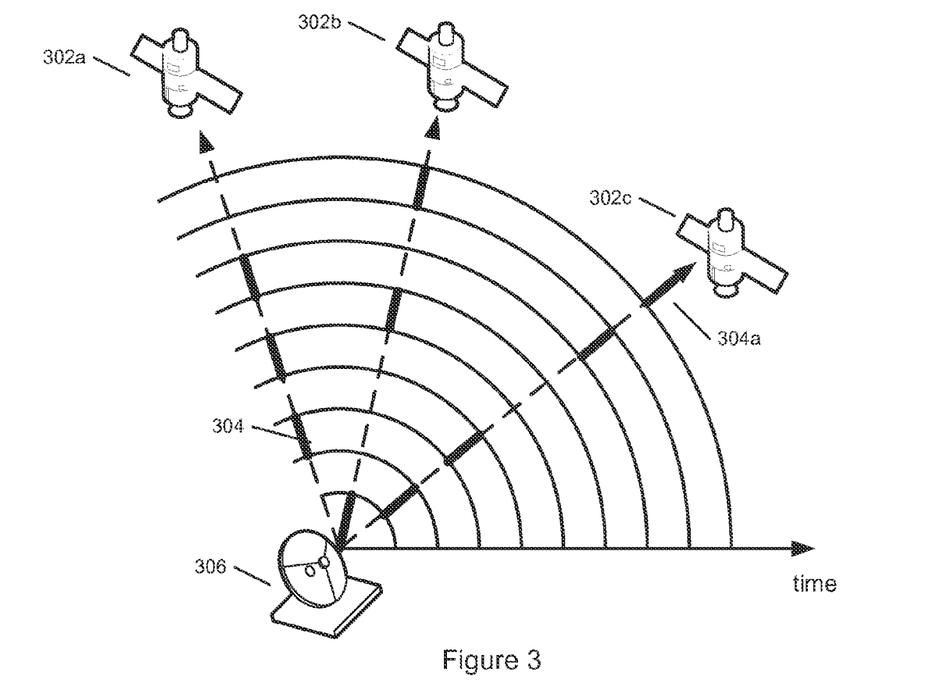
FIG. 3 is an illustration of the outbound traffic packets sent sequentially through a multiplicity of limited availability channels, which may be time-division multiplexed.

In addition to a single transmitter sending a message over multiple channels or pathways, as discussed above, the channels and pathways may be configured to enable multiple communications at once. Multiple users may be able to use a single channel by using one or more of time division multiple access (TDMA), code division multiple access (CDMA), and frequency division multiple access (FDMA), or any other multiple access scheme. FIG. 3 is an illustration of the outbound traffic packets sent sequentially through a multiplicity of limited availability channels which are time-division multiplexed.

As shown in FIG. 3, ground station 306 sends pieces 304 of a message in different time intervals through different pathways involving different satellites 302a-c. During the time periods when ground station 306 is not sending a piece 304 of the message to a given satellite, a different transmitting station may use that channel. For example, if the outermost piece 304a sent to the satellite 302c is the first piece sent, and it is sent at time T=1, and the next piece sent to that satellite is sent at time T=3, a different transmitting station may send a message or a message piece through the satellite 302c at T=2. Other multiple access schemes may be used concurrently or alternatively. For example, the satellite 302a may support two frequency channels, and two transmitters may send messages through that satellite at the same time over the two frequency channels.

Figure 4:
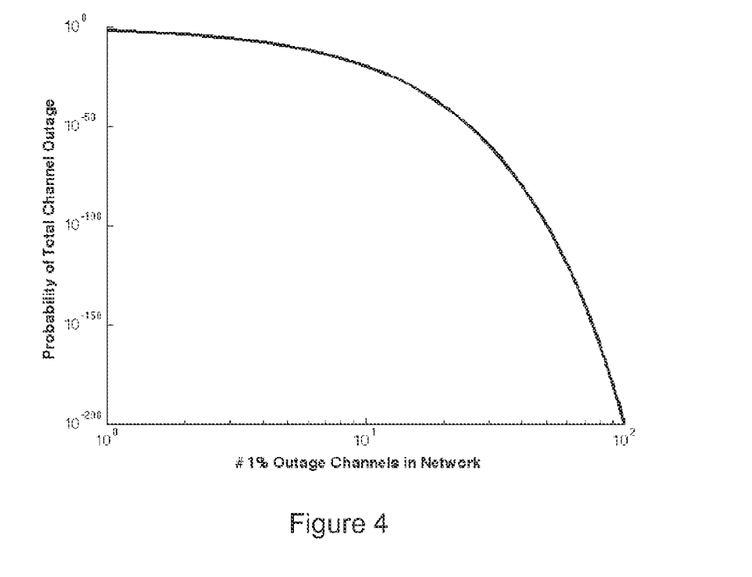
FIG. 4 is a graph showing the channel availability improvement as the number of 1% outage channels in the pool increases.

FIG. 4 is a graph that illustrates the extremely powerful channel availability improvement as the number of channels in the pool increases. In this model, each channel in the channel pool has a 1% chance of having an outage, and the chances of outage between channels are uncorrelated. As the number of channels in the pool increases, the probability of a total channel outage, i.e., the probability that all channels in the system are out, preventing any communications, falls exponentially.

FIG. 5 is a flow diagram showing the operation of and interactions between a network controller, a transmitting station, and a receiving station, resulting in the transmitting station sending a message to the receiving station. At 502, the network controller stores channel availability data describing the channels in the system. This data may include information on outages and error rates, as well as information describing which channels are being used or are scheduled to be used by system users. At 504, the network controller broadcasts a network state vector in an access control channel, which is the channel over which system information is sent. Transmission requests, QOS feedback information, and other network control information may also be sent by the network controller and/or system users in the access control channel. The network state vector allows system users to synchronize with the rest of the network.

At 506, the transmitting station downloads the network state vector, and at 508, synchronizes with the network. The receiving station may synchronize with the network in a similar manner (not shown). After synchronizing with the network, at 510, the transmitting station sends a service request over the access control channel to the network controller. The service request alerts the network controller that the transmitter wants to send a message to the receiver. The service request may include data describing the communication, such as the intended recipient, the size of the message, the message priority, and the priority of the transmitting station and/or receiving station.

At 512, the network controller receives the service request from the transmitting station. At 514, the network controller allocates the transmitting station to a subset of channels in the channel pool over which the transmitter can send the message. As described above, the time-varying subset of channels may include multiple channels along a single physical path (e.g., two channels of a single satellite), as well as channels in different physical paths (e.g., one channel of a first satellite, and one channel of a second satellite). Along with identifying the channels themselves, the network controller may assign the time(s) at which the transmitter may use each channel (if TDMA is used), assign the frequency to use (if FDMA is used), and/or assign a code to the transmitter (if CDMA is used). As demonstrated in FIG. 3, the transmitting station may use different channels at different times, and channels used by the transmitting station may change over time. The network controller updates the channel availability data to reflect the channels and channel properties assigned to the transmitter for this request. The network controller transmits the channel assignment information described above, along with other information needed by the transmitter, such as the channels' bandwidths and the error correction rate, modulation type, and symbol rate to use on each channel, to the transmitting station.

These steps may be performed each time the network controller receives a request from any user in the network. When considering multiple requests, or anticipating future requests, the network controller may consider the type of the receiving and transmitting users, the priorities of the receiving and transmitting users, the priority of message, or other factors to determine how to allocate the available channels and bandwidths between multiple requests. For example, the network controller may allocate higher-priority users and messages to more channels (for faster transmission), higher bandwidth channels, more secure channels, and/or more reliable channels than lower-priority users and messages. In some cases when network capacity or availability is limited, the network controller may temporarily decline requests from lower-priority users until higher-priority traffic is delivered.

Having received the channel assignments and other communications parameters from the network controller, the transmitting station begins transmitting the message to the receiving station via the allocated channels at 516. At 526, the receiving station receives the message. The receiving station may receive the message via multiple channels in several pieces and recombine the pieces during receipt, or after all pieces have been received, to recover the original message. After the transmission begins, at 520, the transmitting station monitors the QOS of its transmission, and transmits some or all of its QOS information to the network controller. At 524, the receiving station also monitors the QOS of the channels, e.g., by determining error rates along each channel or any channel outages. The receiving station transmits some of all of its QOS information as feedback to the transmitting station and to the network controller. At 522, the transmitting station adjusts coding gains and channel exclusions based on its own QOS information and any QOS information from the receiving station. In some cases, the transmitting station may retransmit pieces of the message to the receiver if needed.

At 528, the network controller receives the QOS information from the transmitting and receiving stations. The network controller would be receiving similar information from other users of the network. At 530, the network controller excludes channels that consistently produce error from information traffic; i.e., the network controller no longer assigns transmitting users to these channels. The network controller or user stations may send fill packets in these channels to determine when a minimum channel quality is met, so that information traffic through these channels can be resumed. At 532, the network controller dynamically reallocates bandwidth or remotely turns off users to maintain priority usage of bandwidth. The process of reallocating users (i.e., assigning users to more, fewer, or different channels from those previously assigned) and, when needed, turning off users is performed continually by the network controller to maintain optimum usage of the system considering to the current system status. In addition, the network controller may dynamically update code rates, data rates, and other transmission properties used by the transmitting stations based on received QOS data.

Figure 6A:
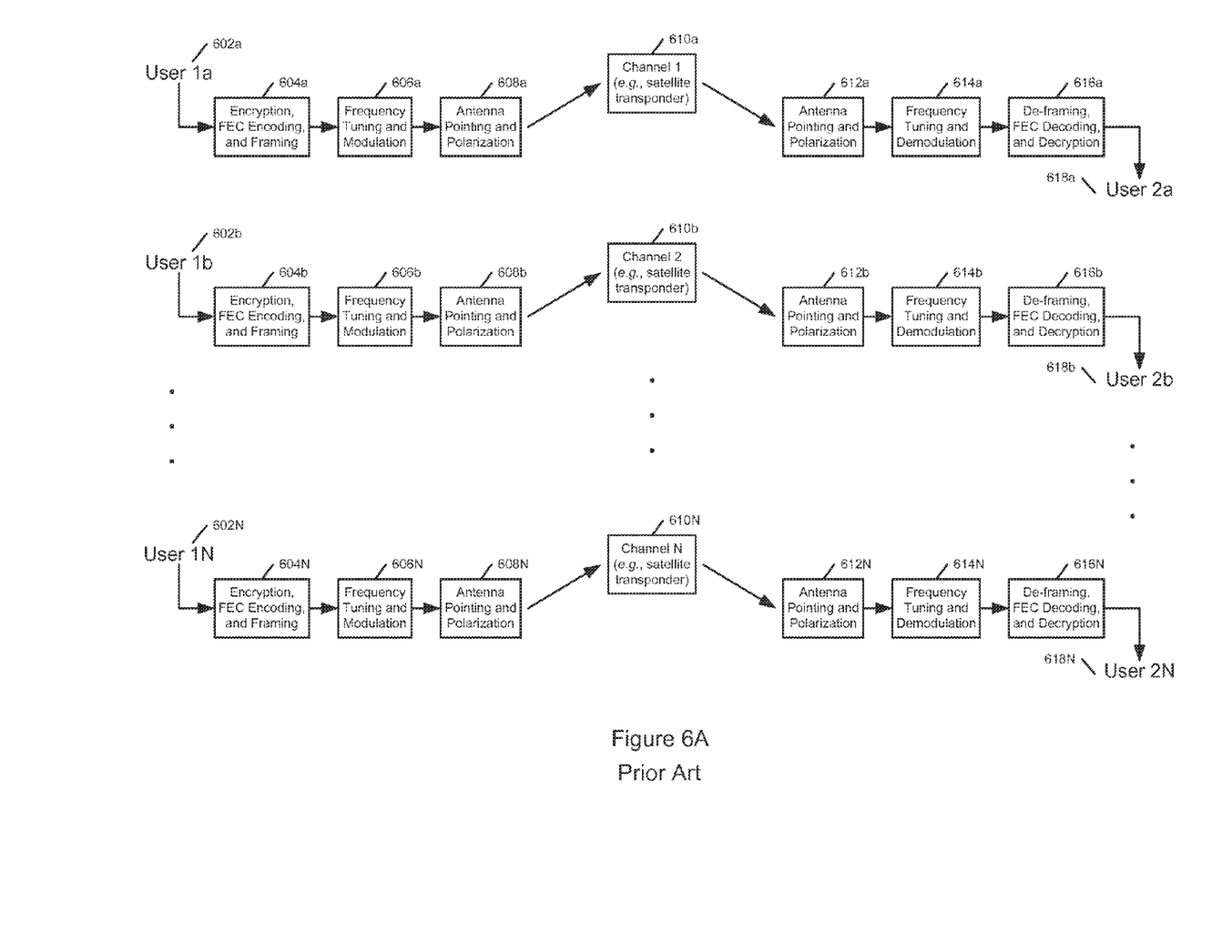
FIG. 6A is a flow diagram showing a single channel per user system of the prior art.

FIG. 6A is a flow diagram that shows a single channel per user system of the prior art. In this system, each user transmits a message to a second user over a single, separate channel. The transmission process showing a transmission from a transmitting user 602*a*, named User 1*a*, to a receiving user 618*a*, named User 2*a*, is shown in steps 604*a* through 616*a*. Similar transmission processes showing transmission from other transmitting users (user 1*b*, 602*b*; user 1N, 602N) to other receiving users (user 2*b*, 618*b*; user 2N, 618N) are also shown.

In steps 604*a* through 608*a*, the first transmitting user, User 1*a*, processes a communication for transmission. At 604*a*, User 1*a*, encrypts the message, performs FEC encoding, and frames the message. At 606*a*, User 1*a* performs frequency tuning and modulation based on the properties of User 1*a*'s assigned communication channel (Channel 1). At 608*a*, User 1*a* performs antenna pointing and polarization so that the antenna can transmit the message through its communication channel (Channel 1). User 1*a* then transmits the encrypted, encoded, and framed message at the specified frequency through the antenna via Channel 1, 610*a*, which may be a satellite transponder or other type of communications channel.

In steps 612*a* through 616*a*, the first receiving user, User 2*a*, processes the received message. At 612*a*, User 2*a* performs antenna pointing and polarization so that it can receive communications from its communication channel (Channel 1). At 614*a*, User 2*a* performs frequency tuning and demodulation of the received message. At 616*a*, User 2*a* performs de-framing, FEC decoding, and decryption on the received message to recover the original message.

These same steps may be performed by each pair of transmitting and receiving users in the system. In this single user per channel system, each channel is used only by a single pair of users. When a pair of users is not utilizing the channel, this bandwidth is wasted because it cannot be utilized by other users. Because communications are sent via fixed channels, they are easily compromised by interception or jamming.

Figure 6B:
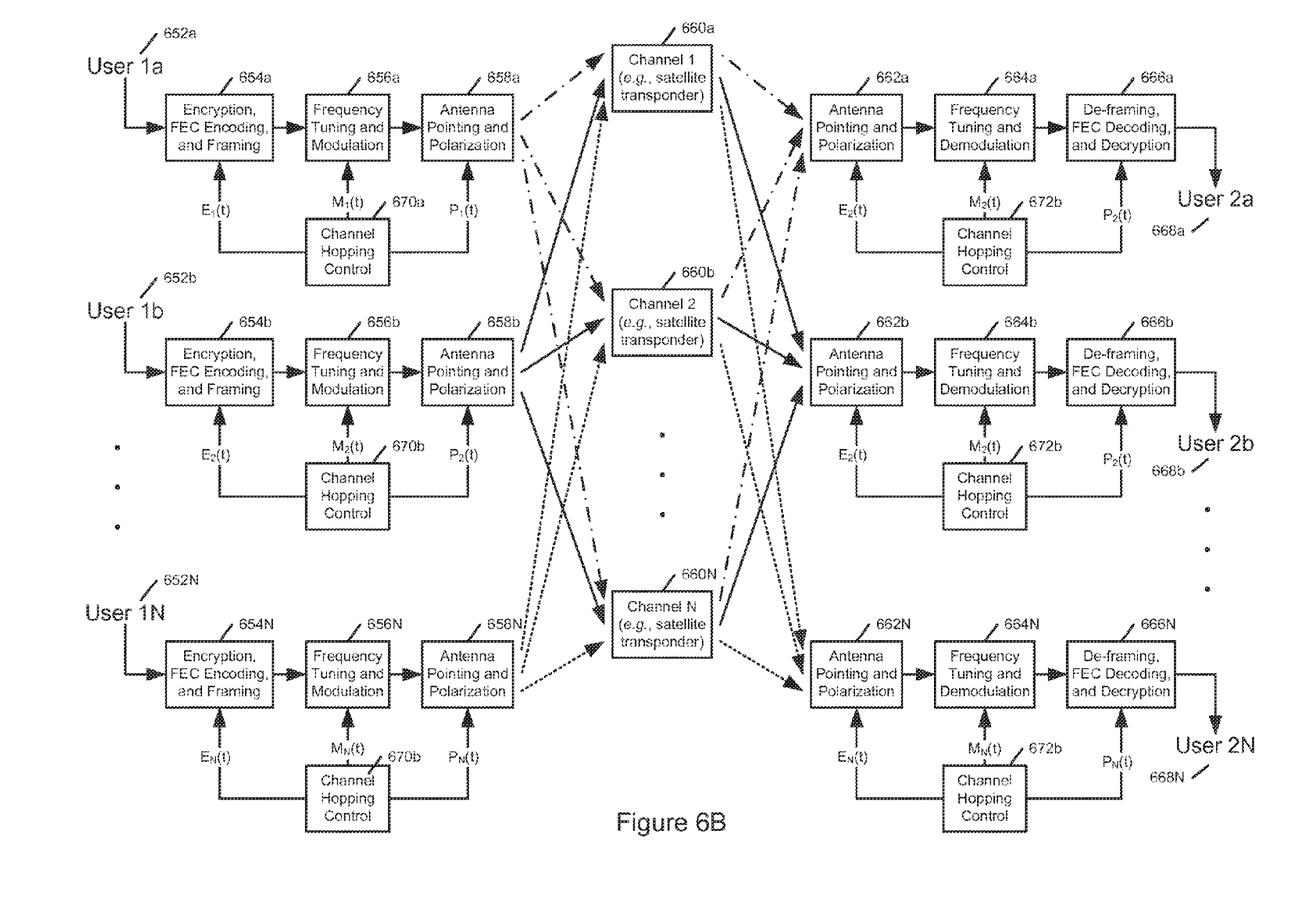
FIG. 6B is a flow diagram demonstrating a pooled communications architecture as used by multiple transmitting and receiving users.

FIG. 6B is a flow diagram demonstrating an improved communications architecture in which channels are pooled and used by multiple transmitting and receiving users. Unlike the flow diagram shown in FIG. 6A, each transmitting user can transmit messages, or portions of messages, through each of the available channels (Channels 1 through N), and each receiving user can receive messages, or portions of messages, through each of the available channels. This allows the transmitting users to use time-multiplexing on a message, such that portions of a message are transmitted through different channels, or the message "hops" between channels. This allows the bandwidth to be optimally allocated among the pool's users, so that unused bandwidth is not wasted, as it was in the single channel per user system shown in FIG. 6A. The hopping scheme also makes it significantly more difficult to compromise the message, e.g., by interception or jamming.

Uplink steps 654 (encryption, FEC encoding, and framing), 656 (frequency tuning and modulation), and 658 (antenna pointing and polarization) are each controlled by a channel hopping controller 670 of the transmitting user 652, which alters these processes over time as the message hops between channels. The channel hopping controller 670 may receive instructions from a network controller, such as the network controller described in relation to FIG. 5. Each channel hopping controller 670n controls the encryption, FEC encoding, and framing process 654n based on a function $E_n(t)$, which provides a time-varying data rate, encryption code, and FEC rate. Each channel hopping controller 670n also controls the frequency tuning and modulation process 656n based on a function $M_n(t)$, which provides a time-varying broadcast frequency and modulation type. Each channel hopping controller 670n further controls the antenna pointing and polarization process 658n based on a function $P_n(t)$, which provides a time-varying antenna pointing/polarization (or, in the case of a terrestrial network, fiber path switching). At a given time $t_1$, a given user 652n transmits a portion of the message to one of the channels 660n as determined by the data rate, encryption code, and FEC encoding $E_n(t_1)$, frequency and modulation $M_n(t_1)$, and pointing/polarization $P_n(t_1)$.

Downlink steps 662 (antenna pointing and polarization), 664 (frequency tuning and demodulation), and 666 (deframing, FEC decoding, and decryption) are each controlled by a channel hopping controller 672 of the receiving user 668, which alters these processes over time as the message hops between channels. The channel hopping controller 672 may receive instructions from a network controller, such as the network controller described in relation to FIG. 5. Each channel hopping controller 672n controls the antenna pointing and polarization 662n based on the function $P_n(t)$, which provides a time-varying antenna pointing/polarization (or, in the case of a terrestrial network, fiber path switching). Each channel hopping controller 672n also controls the frequency tuning and de-modulation process 664n based on the function $M_n(t)$, which provides a time-varying receiving frequency and modulation type. Each channel hopping controller 672n also controls the decryption, FEC de-encoding, and deframing process 666n based on the function $E_n(t)$, which provides a time-varying data rate, decryption code, and FEC rate. A message portion that was transmitted by a transmitting user 652n at time $t_1$ is received and processed by the corresponding receiving user 668n according to the functions $E_n(t_1)$, $M_n(t_1)$, and $P_n(t_1)$. The message portion is received with a slight delay.

Figure 7:
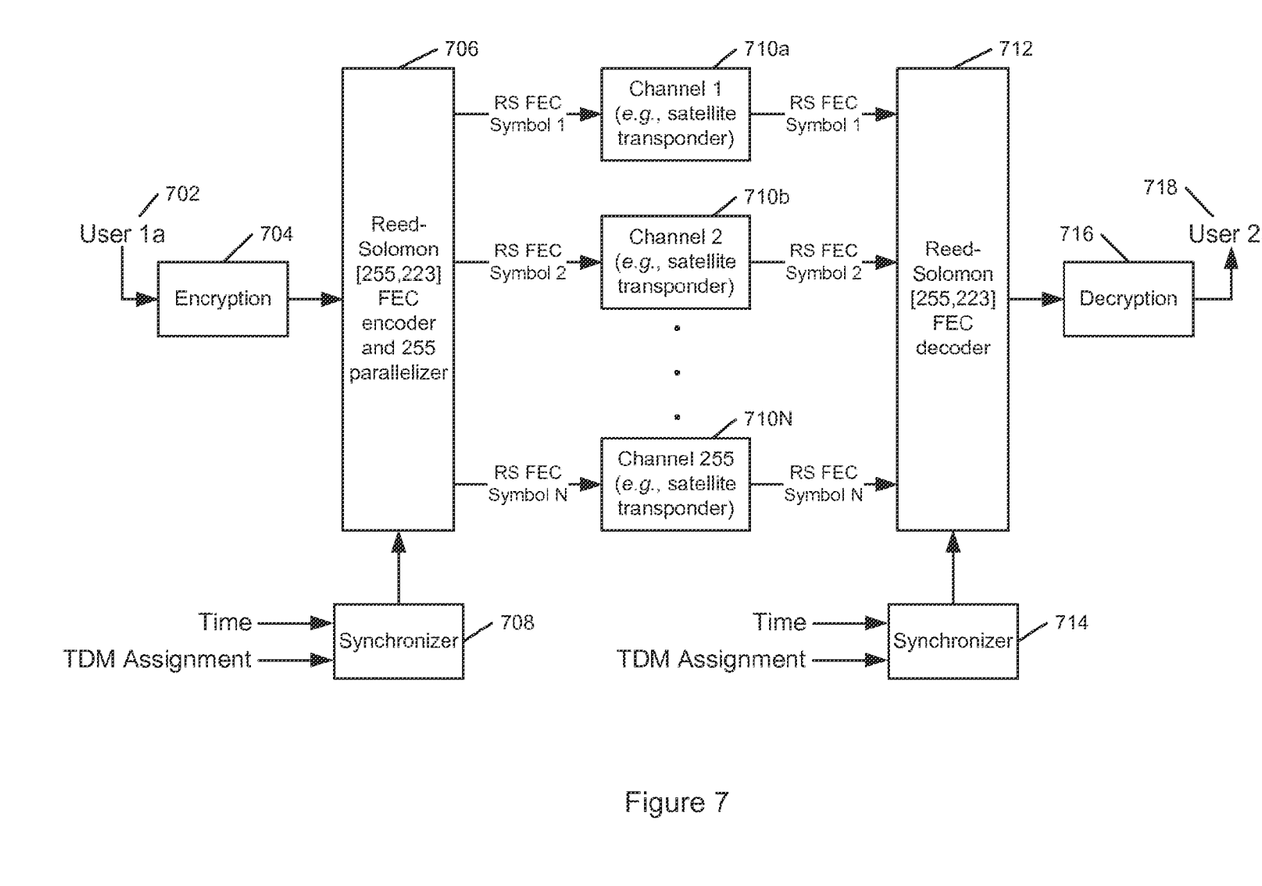
FIG. 7 is a flow diagram showing the pooled communications system as used by one transmitting user and one receiving user.

FIG. 7 is a flow diagram showing an exemplary pooled communications system as used by one transmitting user 702 and one receiving user 718. In this communications system, a message is first encrypted at 704 and then encoded and parallelized at 706. In this example, the encrypted message is encoded using a standard Reed-Solomon [255, 223] FEC encoder, in which 223 input symbols (bytes of data) are encoded into 255 output symbols (bytes of data). The parallelizer then assigns the resulting 255 symbols over 255 parallel paths 710a through 710N based on channel information from synchronizer 708. The synchronizer 708 receives a time input, which is synchronized with other users of the communication system using, for example, a GPS signal or reference broadcast time. The synchronizer 708 also receives a time-division multiplex (TDM) assignment, which may be stored locally, negotiated with other users, or received from a network controller.

Based on the channel assignments, the user 702 transmits the 255 output symbols over 255 distinct parallel channels 710a through 710N (where, in this case, N=255) with a $\frac{1}{255}$ duty cycle. 254 other users (not shown) may also generate 255 symbols and transmit them over the parallel channels 708a through 708N with a $\frac{1}{255}$ duty cycle. The symbols are received by a user 718, which processes the symbols using a Reed-Solomon [255, 223] FEC decoder at 712 and decrypts the received message at 716 to recover the original message. The Reed-Solomon decoder 712 is synchronized with the first user 702 by synchronizer 714.

In a standard Reed-Solomon [255, 233] code, the original message can be recovered if up to 16 of the symbols are lost. Thus, if 16 of the 255 channels fail, each of the 255 messages transmitted by 255 users can still be recovered without any data loss. If each channel has a 1% chance of outage, the likelihood of any data loss (i.e., >16 channel outages) is $10^{-32}$, an extremely low probability that is better than current strategic systems. FIG. 7 is merely an example showing the high performance available; more complex implementations can tailor the code rate, data rate, and channel usage as functions of time based on pooled channel quantity and quality for higher or more tailored performance, and can also send assured data without the use of bandwidth- and time-robbing data acknowledge/resend schemes.

While preferable embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

What is claimed is:

1. A multi-path communication apparatus for multiplexing data within a plurality of communications channels each defined by at least one of a communication satellite, an airborne relay, and a terrestrial communication system, the apparatus comprising:

control circuitry configured to:
  generate a plurality of pieces of data based on a message to be transmitted such that each of the plurality of pieces of data each make up a portion of the message, and the plurality of pieces of data generated based on a total number of communications channels of the plurality of communications channels such that a total number of pieces of data of the plurality of pieces of data is based on the total number of communications channels; and
  assign the plurality of pieces of data to a plurality of communications channels; and
communications circuitry configured to:
  transmit a first piece of the plurality of pieces of data through a first channel of the plurality of communications channels; and
  transmit a second piece of the plurality of pieces of data through a second channel of the plurality of communications channels.

2. The multi-path communication apparatus of claim 1, wherein the communications circuitry comprises at least one of a phased array and a multi-feed parabolic antenna.

3. The multi-path communication apparatus of claim 1, wherein the communications circuitry is further configured to:
  transmit an allocation request to a network controller, the allocation request comprising at least one of a priority and a bandwidth; and
  receive channel allocation information, based on the allocation request, from the network controller.

4. A multi-path communication apparatus for receiving a message transmitted as a plurality of pieces of data that each make up a portion of the message, the plurality of pieces of data transmitted over a plurality of communications channels each defined by at least one of a communication satellite, an airborne relay, and a terrestrial communication system, the plurality of pieces of data generated based on a total number of communications channels of the plurality of communications channels such that a total number of pieces of data of the plurality of pieces of data is based on the total number of communications channels, the apparatus comprising:
communications circuitry configured to:
  receive a first piece of the plurality of pieces of data from a first channel of the plurality of communications channels assigned to a transmitting apparatus; and
  receive a second piece of the plurality of pieces of data through a second channel of the plurality of communications channels assigned to the transmitting apparatus; and
control circuitry configured to:
  combine at least the first piece and the second piece to recover the transmitted message.

5. The multi-path communication apparatus of claim 4, wherein the control circuitry is further configured to:
  determine a quality of service metric for the first channel; and
  transmit, using the communications circuitry, the quality of service metric to one of the transmitting apparatus and a network controller.

6. The multi-path communication apparatus of claim 4, wherein the control circuitry is further configured to:
  determine that it did not successfully receive the first piece of the transmitted message; and request, using the communications circuitry, that the transmitting apparatus retransmit the first piece of the transmitted message using at least one of a different channel and a different code rate.

7. The multi-path communication apparatus of claim 4, wherein the control circuitry is further configured to decode the received first piece and second piece of the transmitted message.

8. A network controller for multiplexing data within a plurality of communications channels each defined by at least one of a communication satellite, an airborne relay, and a terrestrial communication system, the multiplexed data transmitted as a plurality of pieces of data that each make up a portion of a message, the plurality of pieces of data transmitted over the plurality of communications channels and generated based on a total number of communications channels of the plurality of communications channels such that a total number of pieces of data of the plurality of pieces of data is based on the total number of communications channels, the network controller including a controller and a data store, wherein the controller is configured to cause the network controller to:
  store availability data describing availability of a plurality of communications channels;
  allocate a first user to a first subset of the plurality of communications channels based on the availability data;
  update the availability data based on the allocation of the first user; and
  allocate a second user to a second subset of the plurality of communications channels based on the updated availability data.

9. The network controller of claim 8, wherein the updating of the availability data is further based on data describing a channel quality.

10. The network controller of claim 8, wherein the network controller is further configured to:
  assign a forward error correction rate to the first user.

11. The network controller of claim 8, wherein a first channel is included in both the first subset and the second subset, and the first user and the second user share the first channel using a multiple channel-access scheme.

12. The network controller of claim 8, wherein the controller is further configured to cause the network controller to:
  allocate the first user and the second user to the first subset and the second subset based on a priority of the first user and a priority of the second user.

13. The network controller of claim 8, wherein the controller is further configured to cause the network controller to:
  assign a bandwidth to each of the first user and the second user; and
  allocate the first user and the second user to the first subset and the second subset based on the bandwidths of the first user and the second user.

14. The network controller of claim 8, wherein the plurality of communications channels comprise at least one of a commercial satellite communication channel and a government satellite communications channel.

15. A method for allocating users to a plurality of communications channels, for transmission of multiplexed data, the multiplexed data transmitted as a plurality of pieces of data that each make up a portion of a message, the plurality of pieces of data transmitted over the plurality of communications channels and generated based on a total number of communications channels of the plurality of communications channels such that a total number of pieces of data of the plurality of pieces of data is based on the total number of communications channels, the method comprising:

storing availability data describing the availability of the plurality of communications channels;

allocating a first user to a first subset of the plurality of communications channels based on the availability data;

updating the availability data based on the allocation of the first user; and allocating a second user to a second subset of the plurality of communications channels based on the updated availability data.

16. The multi-path communication apparatus of claim 1, wherein the total number of pieces of data is at least as large as the total number of communications channels.

17. The multi-path communication apparatus of claim 1, wherein the communications circuitry is further configured to transmit the plurality of pieces of data using each communications channel of the plurality of communications channels.

18. The multi-path communication apparatus of claim 1, wherein the total number of communications channels includes at least fifty channels.

19. The multi-path communication apparatus of claim 1, wherein the total number of communications channels is such that a probability of failure of every communications channel of the plurality of communications channels is no greater than $10^{-32}$%.

20. The multi-path communication apparatus of claim 1, wherein each of the plurality of pieces of data each make up a different portion of the message.

* * * * *